Aug. 29, 1944.　　J. C. WHITESELL, JR　　2,357,038
AUTOMATIC ELECTRODE DRESSING MEANS
Filed June 13, 1941　　2 Sheets-Sheet 1

INVENTOR
John C. Whitesell Jr.
BY John P. Tacky
ATTORNEY

Aug. 29, 1944. J. C. WHITESELL, JR 2,357,038
AUTOMATIC ELECTRODE DRESSING MEANS
Filed June 13, 1941 2 Sheets-Sheet 2
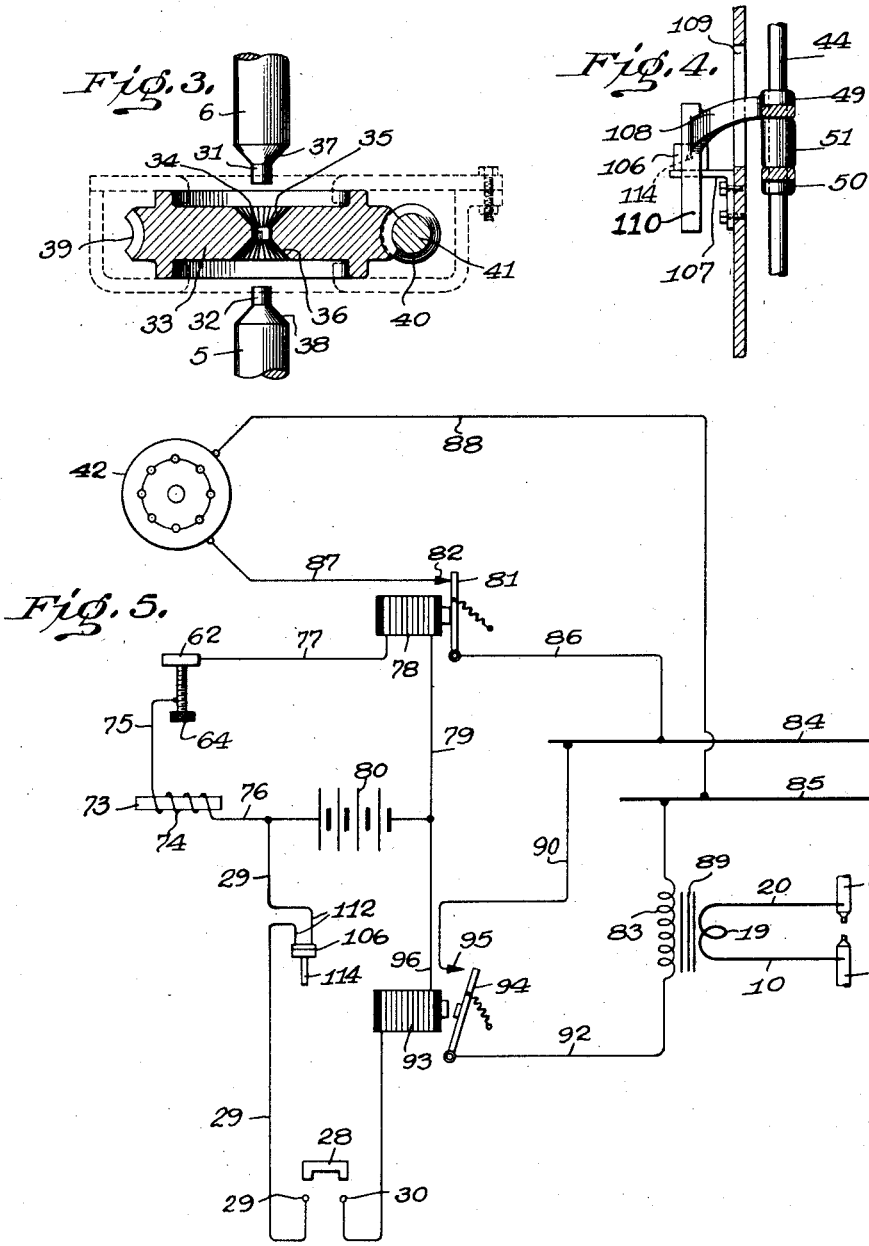
INVENTOR
John C. Whitesell Jr.
BY John P. Tarbox
ATTORNEY Patented Aug. 29, 1944

2,357,038

UNITED STATES PATENT OFFICE 2,357,038

AUTOMATIC ELECTRODE DRESSING MEANS

John C. Whitesell, Jr., Norristown, Pa., assignor to Edward G. Budd Manufacturing Company, Philadelphia, Pa., a corporation of Pennsylvania Application June 13, 1941, Serial No. 397,843

12 Claims. (Cl. 219—4)

The present invention relates to automatic electrode dressing means for use in connection with spot welding machines. It has been found that in order to produce uniform results in spot welding, the electrodes should be kept in proper condition, that is, the diameters of the electrodes should be maintained uniform within a relatively small degree of tolerance.

However, the extreme heat to which the electrodes are subjected when in operation, combined with the high pressure with which they are forced against the work-pieces, gradually causes them to bulge more and more, thus increasing the area of contact with the work-piece and consequently diminishing the current density in the same ratio. Obviously this changes the degree of heat to which the work-pieces are subjected and results in non-uniform welds.

The chief object of the present invention therefore is to provide a mechanism which may be attached to, or built into, a spot welding machine for the purpose of facilitating the re-dressing of the electrodes without removing them from the machine. This mechanism may, for example, comprise an electric motor or the like suitably geared to a milling cutter or similar tool which may be brought at will into alignment with the electrodes, and then actuated to dress the electrodes to the correct configuration.

A further object is to provide interconnecting or interlocking devices between the pedal or other actuating means for the welding machine and the electrode dressing tool, so that the operator will be reminded and/or constrained to dress the tool at proper intervals during the course of his work.

Means also may be provided for positively disconnecting the source of welding current from the machine during the time that the electrodes are being dressed. It will be understood, furthermore, that although a milling cutter or similar device is mentioned above, it is not intended to exclude the provision of an abrasive type of cutter such as a grinding wheel, which may be either of the conventional type, or preformed to grind the correct contour on the electrodes, as preferred in any particular case.

While in its simplest form the invention provides manual devices for actuating the dressing means, it should also be understood clearly that the invention contemplates equally well the provision of automatic or semi-automatic mechanism for performing this function.

The invention will be understood more clearly from the present specification disclosing diagrammatically a machine embodying one form thereof, in connection with the drawings accompanying the same and illustrating the features involved therein.

In said drawings:

Figure 3 is a sectional view on an enlarged scale through the cutter and electrodes on the plane indicated by the line 3—3 of Figure 2, but with the electrodes moved closer together than in Figure 1;

Figure 4 is a section taken substantially on line 4—4 of Figure 2, showing the switch device which prevents energization of the electrodes while the timing device is in its operative position; and Figure 5 is a circuit diagram illustrating the interlocking means between the electrode dressing device and the welding machine.

In all the figures corresponding parts are indicated by the same reference characters.

Figure 1:
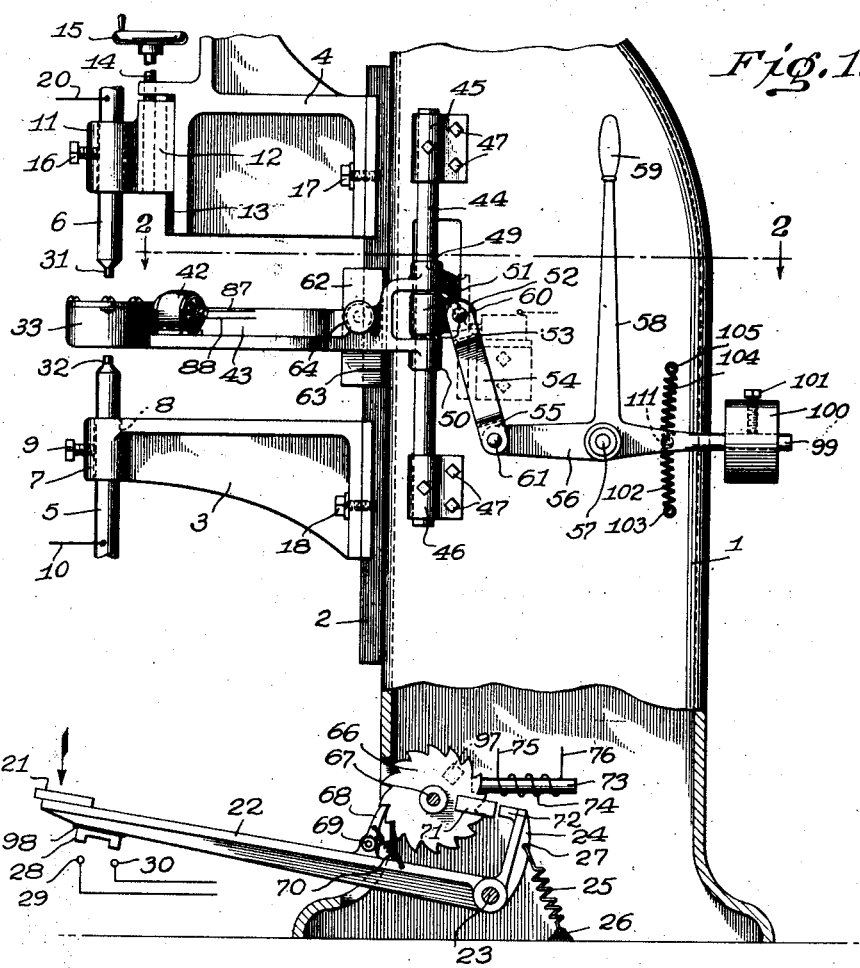
Figure 1 is a side elevation, partly broken away, of a welding machine to which the invention has been applied.

The welding machine comprises a frame 1, which may be mounted suitably wherever desired and which as shown has the general configuration of a hollow rectangular column, whose purpose is to carry the other parts of the mechanism. Preferably a dove-tail guide 2 is formed at the front of the frame 1 to carry two vertically sliding carriage members or brackets 3 and 4.

These members 3 and 4 may be of any suitable shapes and sizes, and have mainly the function of supporting the welding electrodes 5 and 6, which are vertically aligned with one another so as to cooperate with the material to be spot-welded therebetween. The lower electrode 5 may be held in a lug or boss 7 on the bracket 3, being suitably insulated therefrom in any desired way, as by a bushing 8, and being held by a clamping screw 9 or the like. The current may be supplied to this electrode by the conductor or conductors 10 leading to the output winding of the welding transformer.

Figure 2:
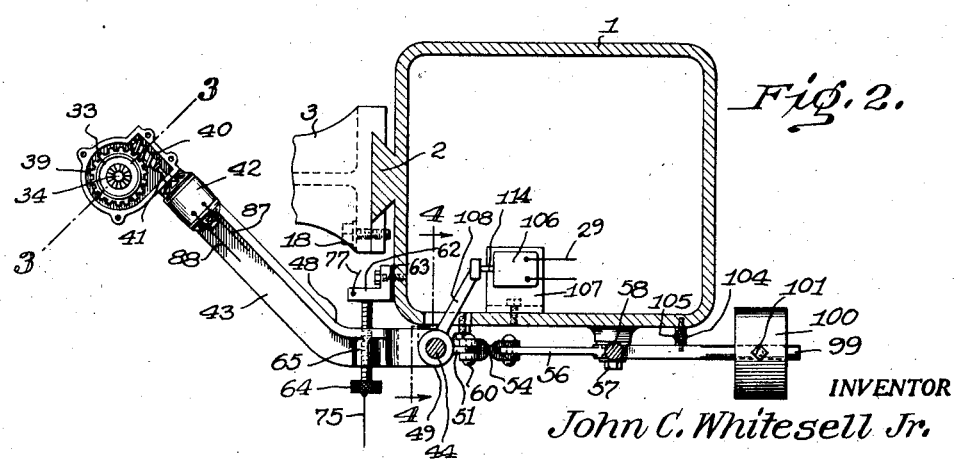
Figure 2 is a sectional plan view partly broken away, the section being made on the plane indicated by the line 2—2 of Figure 1, showing the electrode dressing means moved into its active position.

The upper electrode 6 may be clamped in a bored lug 11 carried by an auxiliary carriage 12 sliding on the dove-tail 13 of the bracket 4. A screw 14 provided with a hand wheel 15 may be employed to shift the carriage 12 vertically, and the electrode 6 may furthermore be adjusted vertically in the lug 11 on the carriage 12 and then clamped by means of the screw 16. The bracket 4 as a whole may be clamped to the dove-tail 2 by means of a screw 17 as shown, and the bracket 3 may be similarly clamped by the corresponding screw 18, as best shown in Figure 2.

Referring now to Figure 5, the welding transformer is shown as having a heavy-current output winding 19, whose terminals 10 and 20 are connected respectively to the electrodes 5 and 6, to supply the welding current.

Returning to Figures 1 and 2, there is shown a treadle 21 carried by a lever 22 pivoted to the frame 1 at 23 and having a short arm 24 extending upwardly from said pivot. A return spring 25 may be provided and anchored at one end to the frame as shown at 26, the other end being passed through a hole 27 near the end of the short arm of the treadle lever, to cause said lever normally to raise the treadle 21.

Carried by the lever 22 is a contact member 28 which may be secured to said lever, but is preferably insulated therefrom as shown at 98. When the treadle 21 is depressed against the effort of the spring 25, the contact member 28 will make electrical connection with the ends of the conductors 29 and 30 as shown in Figure 1, and in the electrical circuit of Figure 5. As will be described hereinafter, depressing the treadle 21 will close the primary circuit of the welding transformer and cause current to be delivered to the welding electrodes.

In the course of time, the tips 31 and 32 of the welding electrodes will become injured by reason of the heavy currents flowing therethrough while under high mechanical stress, so that they no longer have the desired shapes and sizes. This condition obviously will alter the electrical effects produced thereby, thus producing non-uniform welds. In order to correct this defect, means are provided for dressing the active ends of the electrodes when necessary, and these means comprise a rotary tool 33 having an aperture 34 at its center, of the proper size to correspond with the desired outer diameter of the welding electrode tips 31 and 32.

This tool may have a tip dressing surface 35 on one side and a corresponding surface 36 on the other, forming substantially two frusto-conical surfaces nearly meeting at the aperture 34. These cutting surfaces 35 and 36 serve to form the corresponding conical portions 37 and 38 on the electrodes 6 and 5, as best shown in Figure 3.

In order to rotate the tool 33 about its axis, a worm wheel 39 may be formed at its periphery or attached thereto, and this may cooperate with a worm 40 driven by the shaft 41 of a motor 42 carried by an arm 43 mounted on a pivot, consisting of a rod 44 carried by suitable brackets 45 and 46 secured to the frame 1 by screws 47.

It will be noted that the bracket 43 is bent substantially midway of its length as shown at 48, so as to make it possible to bring the cutter 33 into suitable alignment with the welding electrodes. The rear end of the bracket 43 may be bifurcated to form the arms or lugs 49 and 50 each of which is bored to slide on the rod 44 and also is capable of pivoting about the said rod, as already stated. By thus spreading apart the rear end of the bracket 43, smooth and exact guiding and alignment are made possible.

An operating sleeve 51 is also provided and fits slidably on the rod 44, with its ends fitting fairly closely between the lugs 49 and 50 of the bracket 43. The sleeve 51 may have a lug 52 projecting rearwardly therefrom, to engage in the forked upper end 53 of a link 54 whose lower forked end 55 engages the end of the short arm 56 of a right-angle lever pivoted at 57 to the frame 1, and having a vertical arm 58 of convenient length, terminating in a suitable handle 59. Pivots or pins 60 and 61 serve to connect the link 54 to the lug 52 and the lever arm 56, so that by moving the handle 59 forward or back the bracket 43 may be caused to slide down or up on the rod 44 respectively.

It is desirable to counterbalance the weight of the bracket 43 and the parts carried thereby. For this purpose, a weight 100 is disposed adjustably on an arm 99 forming an extension of the lever arm 56, a set screw 101 being provided to hold the weight in its adjusted position.

In order to maintain the lever 56 in a neutral position, such as shown in Figure 1, tension springs 102 and 104 are disposed below and above the arm 56 and connected therewith at their adjacent ends by means of a pin 111. The opposite ends of the springs 102 and 104 are connected to the frame 1, as indicated at 103 and 105 respectively. These springs thus urge the lever 56 to a neutral position.

In order to prevent energization of the welding electrodes 5 and 6 while the electrode dressing device is disposed therebetween for truing the same, a switch 106 is provided in the circuit 29—30 to maintain the electrode circuit open in this position of the dressing device.

The switch 106, which may be of any suitable type, is supported upon a bracket 107 secured to the frame 1 internally thereof as shown in Figures 2 and 4. A preferred method of actuating the switch 106 is to provide the lug 49, for example, with a projection 108 which extends through an opening 109 in the frame 1 and which is formed with an elongated switch operating face 110. The switch operating face 110 is arranged to have contact with the actuating plunger 114 of the switch 106 in such manner as to maintain the switch contacts 112 (Figure 5) open in the operative position of the dressing device and to allow such contacts to close when the arm 43 is swung to remove the dressing device from the position between the electrodes 5 and 6.

The switch 106 thus insures against the passage of current between the electrodes 5 and 6 until the dressing device 33 is swung to its inoperative position.

When it is desired to dress the tips of the welding electrodes, it is necessary only to move the bracket 43 about its pivot rod 44, into the position shown in Figure 2. In order to assure the proper extent of motion, a stop 62 made of metal or other electrically conducting material is provided on the frame 1 and secured thereto but separated from it by suitable insulation as shown at 63 for a purpose that will be explained later. A screw 64 may be threaded through a boss 65 in the lever 43, and may be adjusted until its inner end strikes the stop member 62 when the aperture 34 of the dressing tool is properly aligned with the electrodes.

When in such aligned position, after the motor is in operation the tool 33 may be raised or lowered, as the case may be, to true the corresponding electrode 6 or 5, by merely shifting the handle 59 back or forth as required.

Inasmuch as it is difficult for the operator of the machine when his attention is on the workpieces to note mentally how often the electrodes have been used since they were last trued, it is very desirable to provide automatic interlocks of some kind to prevent the operator from making too many welds before redressing the electrode tips. A simple way in which this may be accomplished has been shown diagrammatically, although it should be understood that in actual practice many additional instrumentalities would probably be used in the electrical circuits, to assure satisfactory commercial operation.

Referring to the lower portion of Figure 1, there is shown a ratchet wheel 66 attached to a suitable point of the frame 1, to turn about the pivot 67. A pawl 68 may be pivotally attached to the treadle lever 22 as shown at 69 with a spring 70 tending to pull the nose of the pawl against the teeth of the ratchet wheel 66. These parts are designed so that after each depression of the treadle the return of the lever 22 will cause the pawl to push the ratchet wheel along to the extent of one tooth. The said wheel may conveniently have its number of teeth equal approximately to the number of welding operations permissible between successive truings of the electrode tips, for example, as shown sixteen teeth for fifteen spot welds. This number of course is entirely arbitrary and depends on many considerations best determined by actual practice, with the object of maintaining the welds uniform within specified limits of permissible variation.

In order to prevent further welds from being made without first truing the electrodes, a stop member 71 may be secured to one face of the ratchet wheel 66 to rotate therewith and to come once in every revolution into position opposite the lug 72 at the end of the lever arm 24. When this happens the lug 72 will abut against the end of the stop member 71 before the treadle 21 can descend far enough to establish electrical connection between the conductors 29 and 30, thus preventing welding current from being applied to the electrodes.

In order to remove the stop member 71 from this position, the iron core 73 is provided with one end closely adjacent an iron armature 97 on the other face of the ratchet wheel 66 and suitably below the same, so that when magnetized, the armature 97 will be pulled down, to cause the stop 71 to clear the lug 72 so that thereafter the treadle 21 may be operated a suitable number of times to turn the ratchet wheel a further revolution before it is again stopped by the member 71.

The core 73 carries a winding 74 to magnetize it at proper times, this winding having the conductors 75 and 76 attached thereto. Referring now to Figure 5 it will be seen that the conductor 75 leads to the screw 64 and thence through the stop member 62 of Figure 2, these parts being in contact when the dressing tool is in alignment with the electrodes. Assuming that this condition exists, the circuit continues through conductor 77, relay winding 78, and conductor 79, to one terminal of a source of electricity 80, whose other terminal is connected to the conductor 76.

Thus whenever the arm 43 is swung into the position indicated in Figure 2, electricity will flow through the windings 74 and 78. One effect of this is to magnetize the core 73 and cause the ratchet wheel 66 to advance out of its locked position and another effect is to cause the armature 81 of the relay 78 to make connection with the contact 82, establishing a circuit through the induction motor 42, connected with the power lines 84 and 85 by auxiliary conductors 86, 87 and 88.

The motor 42 will thus be set into operation and will rotate the tool 33 as long as the arm 43 is in position to maintain the connection through the screw 64 and the stop 62. Thus, with the motor in operation, the lever 58 may be manipulated by means of its handle 59 to raise and lower the tool 33 as necessary, to true the electrodes. When this operation has been finished the operator will swing the truing means out of the way and proceed with the spot welding.

The welding transformer comprises the primary or input winding 83, a suitable core 89, and a secondary winding of heavy wire with relatively few turns for supplying the current to the welding electrodes. As shown, power is delivered to the winding 83 from the power lines 84 and 85 through suitable conductors 90 and 92, a relay winding 93 being interposed to facilitate its control. This relay has the movable contact 94 and the fixed contact 95, so arranged that when current flows through the winding 93 the primary circuit of the welding transformer will be closed. The winding of the relay 93 is energized through the movable contact 28 cooperating with conductors 29 and 30, a conductor 96 completing the circuit through the source of energy 80 already mentioned.

The operation of the invention will be clear from the description of the structure and circuits thereof already given above, but may be summarized briefly as follows:

The welds will be made in any desired or conventional manner by bringing the tips of the electrodes into contact with the material to be welded, and welding current will flow whenever the treadle is depressed. Suitable means may of course be employed to limit the number of cycles of welding current allowed per weld, but this is not a material feature of the present invention and is not disclosed specifically herein.

Each actuation of the treadle 21 will advance the ratchet wheel 66 one tooth and this action will continue until finally the stop member 71 on the ratchet wheel comes into position opposite the end of the lever arm 24 and prevents further actuation of the same. Thereupon the operator must move the stop out of the way by bringing the bracket 43 into electrode dressing position thus establishing a circuit through the winding 74 which moves the stop 71 out of the way and will permit further operation of the treadle.

Meanwhile the motor 42 has come into operation and will turn the dressing tool 33 as long as may be necessary to reshape the points of the electrodes.

It is obvious that many changes may be made in the various details herein disclosed and that some features may be omitted and/or others added, as may be necessary or desirable in any given case, and therefore the invention is to be considered not to be limited to any specific features disclosed, but only by the following claims:

What is claimed is:

1. Means for truing a welding electrode, consisting of a metal dressing tool, a motor, said tool having gear teeth thereon, a companion gear in mesh with said teeth, and driven by said motor, whereby said motor may cause the tool to rotate, an arm carrying said tool, motor, and gearing, and mounted for pivotal movement about an axis parallel to the axis of the welding electrode so as to make it possible to swing the tool manually into and out of an alignment with such axis, and means for shifting the tool at will in a direction parallel to the said axis.

2. In combination with an electric spot-welding apparatus, means for truing a welding electrode thereof, consisting of a rotatable cutting tool having a worm wheel attached thereto, a motor, a worm in mesh with said worm wheel and mounted on the shaft of said motor, whereby said motor may cause the tool to rotate, an arm carrying said tool, motor, and gearing, and mounted for pivotal movement about an axis carried by the apparatus parallel to the axis of the welding electrode so as to make it possible to swing the tool into and out of alignment with such axis, and other means for shifting the tool in a direction parallel to the said axis.

3. In a spot welding apparatus having a supporting base and a welding electrode carried thereby, a rotatable electrode truing tool, a support for said tool, means for movably mounting said support on said base whereby said tool may be moved into and out of truing alignment with the electrode, a tool driving motor, and a driving connection between said motor and tool.

4. In a spot welding apparatus having a supporting base and a welding electrode carried thereby, a rotatable electrode truing tool, a support for said tool, means for pivotally mounting said support on said base whereby said tool may be moved into and out of truing alignment with the electrode, an electric tool driving motor mounted on said support, a driving connection between said motor and tool, a source of electrical energy for said motor, a circuit connecting said source and motor, and a normally open switch in said circuit, closure of said switch being effected by the movement of said support into tool aligning position.

5. In a spot welding apparatus having a supporting base and a welding electrode carried thereby, a rotatable electrode truing tool, a support for said tool, means for movably mounting said support on said base whereby said tool may be moved into and out of truing alignment with the electrode, a tool driving motor mounted on said support, and a driving connection between said motor and tool, said support mounting means including means for permitting axially shifting of said support relative to said electrode.

6. In combination with a spot welding apparatus having welding electrode means, a source of electrical energy, a normally open switch and a circuit including said source, said switch and said electrode means, a dressing tool for truing said electrode means, a support for said tool, means for movably mounting said support whereby said support may be actuated to move said tool into and out of truing alignment with said electrode means, and means under the control of said support for preventing closing of said switch when said support is in tool aligning position.

7. In combination with a spot welding apparatus having welding electrode means, a source of electrical energy, a normally open switch and a circuit including said source, said switch and said electrode means, a dressing tool for truing said electrode means, a support for said tool, means for movably mounting said support whereby said support may be actuated to move said tool into and out of truing alignment with said electrode means, and means under the control of said support for preventing closing of said switch when said support is in tool aligning position, said last-named means including a relay device for actuating said switch, an electrical control circuit for said relay and a normally closed switch in said control circuit, said normally closed switch being actuated to open circuit position by said support upon movement thereof to tool aligning position.

8. In combination with a spot welding apparatus having welding electrode means, a source of electrical energy, a normally open switch and a circuit including said source, said switch and said electrode means, manual means for effecting successive circuit closing and opening operations of said switch, limiting means associated with said manual means for limiting said switch to a predetermined number of operations, a dressing tool for truing said electrode means mounted for movement into and out of truing alignment with said electrode means, and means effective upon movement of said dressing tool into truing alignment with said electrode means to render said limiting means ineffective, whereby to permit reoperation of said manual means.

9. In combination with a spot welding apparatus having welding electrode means, a source of electrical energy, a normally open switch, and a circuit including said source, electrode means and switch, a relay device for actuating said switch, an energizing circuit for said relay device including a source of energy and a normally open circuit breaker, a limiting control circuit having an energizable magnet device and normally open switch contacts, manual means for successively actuating said circuit breaker, limiting means associated with said manual means for limiting said manual means to a predetermined number of successive operations, said limiting means being adapted to be rendered ineffective upon energization of said magnet device, and a dressing tool device for truing said electrode means mounted for manual movement into and out of truing alignment with said electrodes, said dressing tool device upon movement into a position of truing alignment being adapted to close said switch contacts to energize said magnet means.

10. In welding apparatus having a supporting base and a welding electrode carried thereby, a rotatable electrode truing tool and support for said tool, means for pivotally mounting said support on said base, whereby said tool may be moved into and out of truing alignment with the electrode, and power means for driving said tool.

11. In welding apparatus, in combination, a welding electrode subject to deformation in use, a source of electrical energy, a normally open switch, a circuit including said source, switch and electrode, means for effecting successive closing and opening movements of said switch to energize said electrode intermittently, and means associated with said switch, effective after a predetermined number of switch movements, for positively limiting the movement thereof to prevent electrode energization and consequent deformation.

12. In welding apparatus, in combination, a welding electrode subject to deformation in use, a source of electrical energy, a normally open switch, a circuit including said source, switch and electrode, means for effecting successive closing and opening movements of said switch to energize said electrode intermittently, means associated with said switch for positively limiting the movement thereof to a predetermined number of movements to prevent further electrode energization and consequent deformation, and means for rendering said limiting means ineffective.

JOHN C. WHITESELL, Jr.